United States Patent [19]

Ishii et al.

[11] Patent Number: 4,739,999
[45] Date of Patent: Apr. 26, 1988

[54] STEEL LAMINATE GASKET

[75] Inventors: Mitsuru Ishii, Kashiwa; Yoshio Yamada, Koshigaya, both of Japan

[73] Assignee: Ishikawa Gasket Co., Ltd., Tokyo, Japan

[21] Appl. No.: 40,394

[22] Filed: Apr. 20, 1987

[51] Int. Cl.$^4$ ............................................. F16J 15/08
[52] U.S. Cl. ................... 277/235 B; 277/234; 277/236
[58] Field of Search .......... 277/166, 233, 234, 235 R, 277/235 A, 235 B, 236

[56] References Cited

FOREIGN PATENT DOCUMENTS

| 2836626 | 8/1979 | Fed. Rep. of Germany ... 277/235 B |
| 3245383 | 6/1984 | Fed. Rep. of Germany ... 277/235 B |
| 58-210342 | 12/1983 | Japan .............................. 277/235 B |
| 1057861 | 2/1967 | United Kingdom ............ 277/235 B |
| 2092244 | 8/1982 | United Kingdom ............ 277/235 B |
| 482561 | 12/1975 | U.S.S.R. ......................... 277/235 B |

Primary Examiner—Robert S. Ward
Attorney, Agent, or Firm—Frank J. Jordan; C. Bruce Hamburg; Manabu Kanesaka

[57] ABSTRACT

A steel laminate gasket for an internal combustion engine having a cylinder liner with a cylindrical portion and a flange. The gasket comprises an upper plate situated above the flange and the cylindrical portion, a lower plate having a lower opening, and a plurality of middle plates situated between the upper and lower plates. The diameter of the lower opening is larger than the inner diameter of the cylindrical portion of the cylinder liner and is smaller than the outer diameter of the cylindrical portion. The gasket is further provided with a main sealing device formed by at least one of the middle plates, and an auxiliary sealing device formed by at least one of the upper plate and middle plates. The auxiliary sealing device is weaker than the main sealing device and is situated adjacent to a curved portion of the lower plate between a main lower portion and a collar of the lower plate.

13 Claims, 2 Drawing Sheets

STEEL LAMINATE GASKET

BACKGROUND OF THE INVENTION AND RELATED ART STATEMENT

The present invention relates to a steel laminate gasket for an internal combustion engine with a cylinder liner therein.

In some engines, such as diesel engines, a cylinder liner is installed in each cylinder bore of an engine, wherein a steel laminate gasket is situated between a cylinder head and the cylinder liner. The conventional cylinder liner is provided with a cylindrical portion, a flange at an upper portion of the cylindrical portion extending radially outwardly from the cylindrical portion, and a projection extending upwardly from an upper end of the cylindrical portion. The thickness of the projection is substantially the same as or less than that of the cylinder liner.

In case a steel laminate gasket is installed in the cylinder liner, the gasket is mounted on the flange. The height or thickness of the gasket is made higher than the height of the projection, so that a small space is formed between the cylinder head and the projection of the cylinder liner. Further, since a bore of the gasket is made slightly larger than the outer diameter of the projection, an annular space is formed between the projection and the gasket. The annular space is not utilized, so that it is preferable to reduce volume of the annular space.

Japanese Utility Model Publication (Kokai) No. 57-10446 proposes an auxiliary sealing portion, which is formed inside a main sealing portion of a gasket. The auxiliary sealing portion may be formed by one of plates constituting a gasket, or formed separately. The auxiliary sealing portion operates to prevent the sealing pressure from concentrating at the flange of the cylinder liner as well as to reduce the annular space. However, since the rigidity of the auxiliary sealing portion is not strong, if high sealing pressure or high combustion pressure is applied to the auxiliary sealing portion, the auxiliary sealing portion can not seal properly.

Japanese Utility Model Publication (Kokai) No. 57-196244 proposes a fire ring, which is located inside the bore of a gasket. However, since the fire ring is manufactured separately from the gasket, it requires additional labor and expense. Also, it is not easy to assemble the fire ring and the gasket and to install them to the engine. Further, the Japanese publication No. 57-196244 proposes to provide two sealing portions in one gasket. If the sealing portions are located on the flange and the cylindrical portion of the cylinder liner respectively, the flange of the cylinder liner may be broken because of sealing pressure equally applied to the flange and the cylindrical portion. High sealing pressure can not apply to the cylindrical portion of the cylinder liner.

The present invention has been made to obviate the drawbacks of the prior art.

One object of the present invention is to provide a steel laminate gasket, which reduces volume of the annular space formed between a projection of a cylinder liner and the gasket.

Another object of the present invention is to provide a steel laminate gasket as stated above, which is provided with a rigid auxiliary sealing portion to improve sealing ability.

A further object of the invention is to provide a steel laminate gasket as stated above, which can be manufactured easily and economically.

Further objects and advantages of the invention will be apparent from the following description of the invention.

SUMMARY OF THE INVENTION

A steel laminate gasket of the invention is installed in an internal combustion engine having a cylinder liner with a cylindrical portion and a flange. The steel laminate gasket comprises an upper plate, a lower plate, a plurality of middle plates situated between the upper and lower plates, main sealing means formed by at least one of the middle plates, and auxiliary sealing means formed by at least one of the upper plate and the middle plates.

The upper plate is located above the flange and the cylindrical portion of the cylinder liner and includes at least one upper opening with an inner end. The inner end defines the upper opening.

The lower plate is provided with at least one lower opening, wherein the diameter of the lower opening is larger than the inner diameter of the cylindrical portion of the cylinder liner and smaller than the outer diameter of the cylindrical portion. The lower plate includes a main lower portion, a curved portion extending upwardly from the main lower portion for defining the lower opening, and a collar extending laterally from the curved portion. The collar is situated on a part of the upper plate.

The main sealing means is situated above the flange so that when the gasket is tightened, the main sealing means operates to substantially seal. The auxiliary sealing means is situated adjacent to the curved portion between the main lower portion and the collar so that when the gasket is tightened, the auxiliary sealing means operates to seal around the cylindrical portion of the cylinder liner. Sealing pressure of the main sealing means is stronger than sealing pressure of the auxiliary sealing means.

In order to provide the main sealing means stronger than the auxiliary sealing means, the thickness of the middle plate having the main sealing means may be thicker than that of the plate having the auxiliary sealing means. Alternatively, the total thickness of the plates at a portion adjacent the main sealing means may be thicker than the total thickness of the plates at a portion adjacent the auxiliary sealing means. Also, the width of the main sealing means may be shorter than that of the auxiliary sealing means. Further, the middle plate having the main sealing means may be made of a material harder than the plate having the auxiliary sealing means.

The main sealing means is a main bead extending around the lower opening and formed on at least one of the middle plates. The auxiliary sealing means is an auxiliary bead extending around the lower opening between the main bead and the lower opening.

DETAILED DESCRIPTION OF PREFERRED EMBODIMENTS

Figure 1:
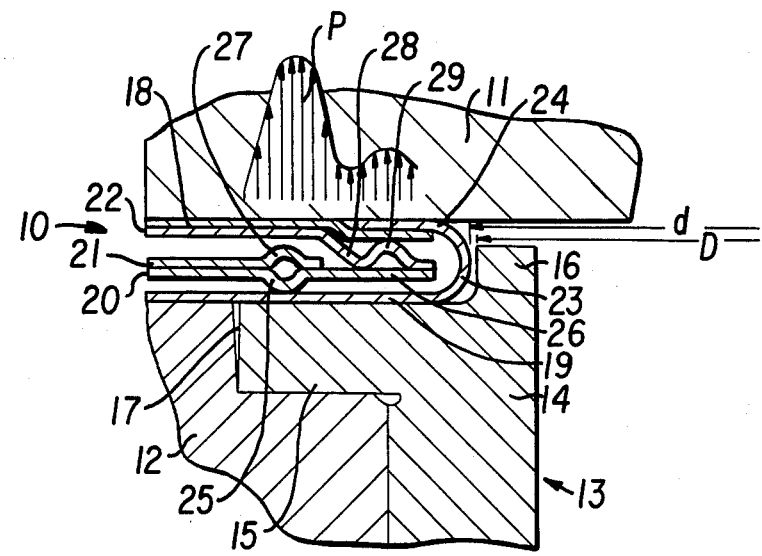
FIG. 1 is an explanatory section view of a part of a first embodiment of a steel laminate gasket of the invention, wherein the gasket is installed between a cylinder liner and an engine.

Referring to FIG. 1, a first embodiment 10 of a steel laminate gasket of the present invention is shown. In the first embodiment, the steel laminate gasket 10 is situated between a cylinder head 11 and a cylinder block 12 equipped with a cylinder liner 13.

The cylinder liner 13 is provided with a cylindrical portion 14, an annular flange 15 extending radially outwardly from the cylindrical portion 14, and an annular projection 16 extending upwardly from the cylindrical portion 14. The flange 15 is situated in an annular recess 17 of the cylinder block 12.

The steel laminate gasket 10 of the present invention comprises an upper plate 18, a lower plate 19, and three middle plates 20, 21, 22 situated between the upper and lower plates. The lower plate 19 is provided with a curved portion 23, and a collar 24 partly situated above an inner portion of the upper plate 18. The inner diameter d of the curved portion is slightly larger than the outer diameter D of the annular projection 16 to minimize an annular space therebetween.

The middle plate 20 is provided with an annular bead 25 and an extension 26, while the middle plate 21 is provided with an annular bead 27 at an inner end portion thereof. The middle plate 22 is provided with a diagonal portion 28, and an annular bead 29 situated above the extension 26 of the middle plate 20. The beads 25, 27 are located above the flange 15 of the cylinder liner 13, while the bead 29 is situated adjacent to the curved portion 23 of the lower plate 19.

When the gasket 10 is situated between the cylinder head 11 and the cylinder block 12 with the cylinder liner 13 and is tightened, main sealing pressure is formed by the beads 25, 27, while auxiliary sealing pressure is formed by the bead 29. The main sealing pressure is stronger than the auxiliary sealing pressure to substantially seal between the cylinder head 11 and the cylinder block 12 by the main sealing pressure. In the gasket 10, since the thickness of the middle plates 20, 21 is made thicker than that of middle plate 22, the beads 25, 27 can provide sealing pressure stronger than the bead 29. The sealing pressure formed by the beads 25, 27, 29 is illustrated as P in FIG. 1.

In the gasket 10, the curved portion 23 is located close to the projection 16, and also the bead 29 is formed adjacent to the curved portion 23. Therefore, when the gasket 10 is tightened, the cylinder head 11 and the cylinder liner 13 are sealed adjacent to the projection 16 by means of the bead 29. Further, the cylinder head 11 and the cylinder liner 13 are sealed at the flange 15 by means of the beads 25, 27. Namely, mechanically strong portion of the cylinder liner 13 (flange 15 supported by the cylinder block 12) is sealed by the main sealing pressure, and a portion of the cylinder liner 13 which is not so strong mechanically (cylindrical portion 14 adjacent the projection 16) is sealed by the auxiliary sealing pressure. Since the cylindrical portion 14 is sealed by the auxiliary sealing pressure which is not so strong as the main sealing pressure, the cylinder liner 13 is not damaged at all in use.

Since the gasket 10 provides the main and auxiliary sealing pressure, the gasket 10 can properly and securely seal around the cylinder liner 13.

The steel laminate gasket of the present invention as explained above can be modified as explained below, wherein the same numerals as in the gasket 10 are used for the same members.

Figure 2:
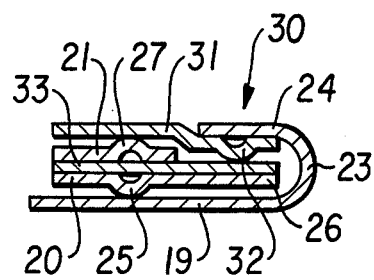
FIG. 2 is a section view of a part of a second embodiment of a steel laminate gasket of the invention.

FIG. 2 shows a second embodiment 30 of a steel laminate gasket of the invention. The gasket 30 comprises an upper plate 31 with a bead 32, a lower plate 19 with a curved portion 23 and a collar 24, a middle plate 20 with a bead 25 and an extension 26, and a middle plate 21 with a bead 27. A middle plate 33 is situated between the middle plates 20, 21. The bead 32 is located under the collar 24 and above the middle plates 20, 33. The auxiliary sealing pressure is formed by the bead 32, while the main sealing pressure is formed by the beads 25, 27. In the gasket 30, since the upper plate 31 is made of a material softer than that of the middle plates 20, 21, 33, the beads 25, 27 can provide the sealing pressure stronger than the bead 32. Preferably, the upper plate 31 having the bead 32 is made of a soft steel plate having Micro Vickers Hardness 80–140 Hmv, and the middle plates 20, 21 having the beads 25, 27 are made of stainless steel plates having Micro Vickers Hardness 180–450 Hmv. The gasket 30 can seal as in the gasket 10.

Figure 3:
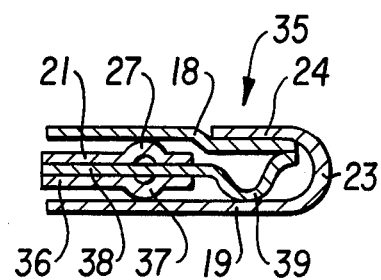
FIG. 3 is a section view of a part of a third embodiment of a steel laminate gasket of the invention.

FIG. 3 shows a third embodiment 35 of a steel laminate gasket of the invention. The gasket 35 comprises an upper plate 18, a lower plate 19 with a curved portion 23 and a collar 24, a middle plate 21 with a bead 27, a middle plate 36 with a bead 37, and a middle plate 38 between the middle plates 21, 36. The middle plate 38 is provided with a bead 39 adjacent the curved portion 23. The auxiliary sealing pressure is formed by the bead 39, while the main sealing pressure is formed by the beads 27, 37. In the gasket 35, since the total thickness of the plates 18, 19, 21, 36, 38 adjacent the beads 27, 37, is thicker than the total thickness of the plates 18, 19, 38 adjacent the bead 39, the beads 27, 37 can provide the sealing pressure stronger than the bead 39. Also, since the width of the bead 27, 37 is shorter than that of the bead 39, the beads 27, 37 can provide the sealing pressure stronger than that of the bead 39 as well. The gasket 35 can seal as in the gasket 10.

Figure 4:
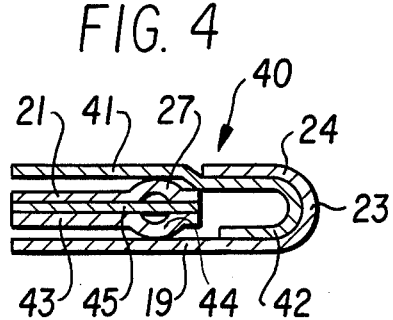
FIG. 4 is a section view of a part of a fourth embodiment of a steel laminate gasket of the invention.

FIG. 4 shows a fourth embodiment 40 of a steel laminate gasket of the invention. The gasket 40 comprises an upper plate 41 with a curved portion 42, a lower plate 19 with a curved portion 23 and a collar 24, a middle plate 21 with a bead 27, a middle plate 43 with a bead 44, and a middle plate 45 between the middle plates 21, 43. The curved portion 42 extends inside the collar 24 and the curved portion 23 and is located above the lower plate 19. The auxiliary sealing pressure is formed by the curved portion 42, while the main sealing pressure is formed by the beads 27, 44. In the gasket 40, since the total thickness of the plates 19, 21, 41, 43, 45 adjacent the beads 27, 44 is thicker than the total thickness of the plates 19, 41 adjacent the curved portion 42, the beads 27, 44 can provide the sealing pressure stronger than that at the curved portion 42. The gasket 40 can seal as in the gasket 10.

Figure 5:
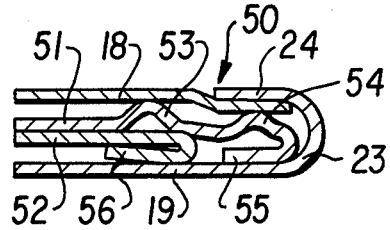
FIG. 5 is a section view of a part of a fifth embodiment of a steel laminate gasket of the invention.

FIG. 5 shows a fifth embodiment 50 of a steel laminate gasket of the invention. The gasket 50 comprises an upper plate 18, a lower plate 19 with a curved portion 23 and a collar 24, and middle plates 51, 52. The middle plate 51 is provided with an outer annular bead 53, an inner annular bead 54, and a turning portion 55. The middle plate 52 is provided with a turning portion 56 located under the bead 53. The auxiliary sealing pressure is formed by the inner annular bead 54, while the main sealing pressure is formed by the outer annular bead 53. The gasket 50 can seal as in the gasket 10.

Figure 6:
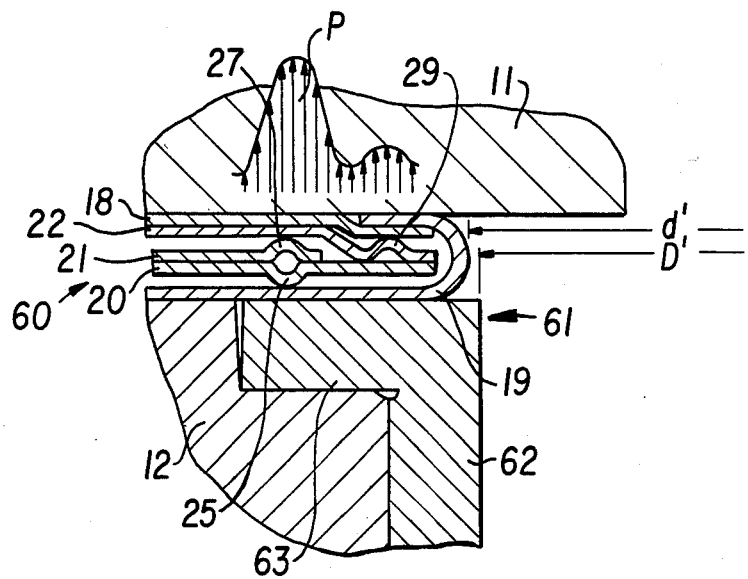
FIG. 6 is an explanatory section view of a part of a sixth embodiment of a steel laminate gasket of the invention, wherein the gasket is installed between a cylinder liner and an engine.

FIG. 6 shows a sixth embodiment 60 of a steel laminate gasket of the invention. The gasket 60 comprises an upper plate 18, a lower plate 19, and three middle plates 20, 21, 22, as in the gasket 10. Although the gasket 60 is formed almost the same as the gasket 10, the diameter d' of the gasket 60 is smaller than the diameter d of the gasket 10. The diameter d' is slightly larger than the inner diameter D' of a cylinder liner 61. Namely, the gasket 60 is designed to seal the cylinder liner 61 having a cylindrical portion 62 and a flange 63 (without a projection).

The gaskets of the present invention providing the auxiliary sealing pressure and the main sealing pressure stronger than the auxiliary sealing pressure can seal properly for a cylinder liner with or without a projection.

In the present invention, the auxiliary sealing means is formed inside the main sealing means and is located close to the inner periphery of the cylinder liner. Therefore, it is possible to reduce unnecessary space formed inside the gasket without a fire ring and to seal adjacent to the inner periphery of the cylinder liner. Also, the auxiliary sealing means can be manufactured easily.

While the invention has been explained with reference to the specific embodiments of the invention, the explanation is illustrative and the invention is limited only by the appended claims.

What is claimed is:

1. A steel laminate gasket for an internal combustion engine having a cylinder liner with a cylindrical portion and a flange, comprising:
    an upper plate situated above the flange and the cylindrical portion, said upper plate having at least one upper opening with an inner end for defining the upper opening,
    a lower plate having at least one lower opening, diameter of the lower opening being larger than inner diameter of the cylindrical portion of the cylinder liner and smaller than outer diameter of the cylindrical portion, said lower plate including a main lower portion, a curved portion extending upwardly from the main lower portion for defining the lower opening, and a collar extending laterally from the curved portion and being situated on a part of the upper plate,
    a plurality of middle plates situated between the upper and lower plates and located at least above the flange,
    main sealing means formed by at least one of the middle plates, said main sealing means being situated above the flange so that when the gasket is tightened, the main sealing means operates to substantially seal, and
    auxiliary sealing means formed by at least one of the upper plate and middle plates, said auxiliary sealing means being situated adjacent to the curved portion between the main lower portion and the collar of the lower plate and providing therearound auxiliary sealing pressure lower than sealing pressure by the main sealing means so that when the gasket is tightened, the auxiliary sealing means operates to seal around the cylindrical portion.

2. A steel laminate gasket according to claim 1, in which said main sealing means is a main bead extending around the lower opening and formed on at least one of the middle plates.

3. A steel laminate gasket according to claim 2, in which said auxiliary sealing means is an auxiliary bead extending around the lower opening between the main bead and the lower opening.

4. A steel laminate gasket according to claim 3, in which thickness of the middle plate having the main sealing means is thicker than that of the plate having the auxiliary sealing means so that the main sealing means provides the sealing pressure stronger than that of the auxiliary sealing means.

5. A steel laminate gasket according to claim 4, in which three middle plates are situated between the upper and lower plates, two middle plates having the main beards respectively and the middle plate without beads having the auxiliary bead.

6. A steel laminate gasket according to claim 5, in which one of the middle plates having the main beads is provided with an extension extending adjacent to the curved portion, said auxiliary bead being situated above the extension.

7. A steel laminate gasket according to claim 4, in which at least one of the middle plates is provided with an extension extending adjacent to the curved portion, said upper plate having the auxiliary bead situated between the extension of the middle plate and the collar.

8. A steel laminate gasket according to claim 3, in which total thickness of the plates at a portion adjacent the main sealing means is thicker than total thickness of the plates at a portion adjacent the auxiliary sealing means so that the main sealing means provides the sealing pressure stronger than that of the auxiliary sealing means.

9. A steel laminate gasket according to claim 8, in which three middle plates are situated between the upper and lower plates, two middle plates having the main beads respectively and the middle plate having the auxiliary bead being situated between the two middle plates with the main beads.

10. A steel laminate gasket according to claim 3, in which width of the main bead is shorter than that of the auxiliary bead so that the main sealing means provides the sealing pressure stronger than that of the auxiliary sealing means.

11. A steel laminate gasket according to claim 3, in which the middle plate having the main bead is made of a material harder than the plate having the auxiliary bead so that the main sealing means provides the sealing pressure stronger than that of the auxiliary sealing means.

12. A steel laminate gasket according to claim 3, in which said main sealing means and the auxiliary sealing means are formed on the same middle plate.

13. A steel laminate gasket according to claim 2, in which said upper plate is provided with a spring portion extending along the curved portion to the main lower portion, said spring portion forming the auxiliary sealing means.

* * * * *